United States Patent [19] [11] Patent Number: 4,587,332
Lane et al. [45] Date of Patent: May 6, 1986

[54] MODIFIED WHEAT "B" STARCH FOR CORRUGATING ADHESIVES

[75] Inventors: Christopher C. Lane, Kirkland; Alexander B. Anonychuk, Brossard; Peter Unger, St. Lambert, all of Canada

[73] Assignee: Ogilvie Mills Ltd., Montreal, Canada

[21] Appl. No.: 700,868

[22] Filed: Feb. 12, 1985

Related U.S. Application Data

[63] Continuation-in-part of Ser. No. 584,346, Feb. 28, 1984, abandoned.

[51] Int. Cl.$^4$ .......................... C08B 31/00; C09J 3/06; C08L 3/02
[52] U.S. Cl. ...................... 536/102; 106/210; 106/213; 127/32; 127/33; 127/36; 127/71; 162/111; 162/112; 156/336; 428/179; 428/182; 536/105; 536/106
[58] Field of Search ....................... 536/102, 105, 106; 106/210, 213; 127/32, 33, 36, 71; 156/336; 162/111, 112; 428/179, 182

[56] References Cited

U.S. PATENT DOCUMENTS

| | | | |
|---|---|---|---|
| 2,051,025 | 8/1936 | Bauer | 106/213 |
| 2,102,937 | 12/1937 | Bauer | 106/213 |
| 2,642,185 | 6/1953 | Fontein | 127/71 |
| 2,779,693 | 1/1957 | Pacsu et al. | 106/210 |
| 2,779,694 | 1/1957 | Pacsu et al. | 127/33 |
| 2,822,305 | 2/1958 | Bus et al. | 127/33 |
| 3,374,115 | 3/1968 | Frank et al. | 127/33 |
| 3,475,215 | 10/1969 | Maurer | 106/210 |
| 3,479,200 | 11/1969 | Estabrooks | 427/101 |
| 3,901,725 | 8/1975 | Bond et al. | 127/71 |
| 3,912,531 | 10/1975 | Musselman et al. | 106/213 |
| 3,951,948 | 4/1976 | Bond et al. | 106/130 |
| 4,137,094 | 1/1979 | Hughes | 127/32 |
| 4,157,318 | 6/1979 | Sadle et al. | 428/186 |
| 4,158,574 | 6/1979 | Cummisford et al. | 127/32 |
| 4,343,654 | 8/1982 | Ware et al. | 106/210 |

Primary Examiner—Ronald W. Griffin
Attorney, Agent, or Firm—Fisher, Christen & Sabol

[57] ABSTRACT

The present invention relates to second grade starches and wheat "B" starches in particular which, following conventional modification treatments to produce a correspondingly viscosity-reduced starch, are especially useful in the production of Stein-Hall corrugating adhesives. Corrugated paper board products manufactured using such adhesives have improved properties. In one aspect of the present invention there is provided a modified wheat "B" starch wherein aqueous dispersions of the modified "B" starch have reduced viscosities relative to comparable dispersions of a corresponding unmodified wheat "B" starch, the reduced viscosity not being less than about 12 centipoise grams per cubic centimeter for a specified dispersion.

55 Claims, No Drawings

MODIFIED WHEAT "B" STARCH FOR CORRUGATING ADHESIVES

This is a continuation-in-part of application Ser. No. 584,346, filed Feb. 28, 1984 now abandoned.

Corrugated paper board consists of flat and corrugated sheets of paper, bonded to one another with an adhesive composition. Single faced corrugated paper board is a two ply product consisting of a flat sheet called a liner, and a corrugated sheet called the medium, joined together with adhesive applied along the crests, called flutes, of the corrugated medium where the flutes contact the liner. A double faced board is a three ply product consisting of single faced board and a further, or second, liner positioned like the first liner but on the opposite or exposed surface of the medium ply.

Corrugated paper board is generally made by a continuous process wherein a slightly moistened roll of paper is passed through heated fluting rolls to form the corrugated medium ply. An adhesive composition is then applied to the flutes along one face of the medium which face is subsequently brought into contact under heat and pressure with a sheet of liner paper to make what is known as single face board. When double faced board products are desired, the two ply composite thus formed is then passed to a "double backer" machine where a second liner is applied to produce the three ply composite known as single wall board. Composites with a further one or more single face boards are referred to as double wall boards, triple wall boards, et cetera.

As a generalization, economical operational machine speeds range from about 300 to about 900 linear feet per minute of board, with the upper limit being greatly influenced by the properties of the adhesive composition being used. This is particularly the case when three ply double-faced corrugated board is being manufactured, since the rate limiting step in such circumstances is the application of the second liner, it being appreciated that the second liner cannot be applied under other than the most nominal of pressures in order to avoid undesirable distortion or even crushing of the corrugated medium.

Accordingly, the adhesive must be capable of forming a quickly developed high strength green bond between the second liner and the medium under far less favourable conditions than are available when bonding the first liner to the medium with the more rigorous heat and pressures which can be applied at that juncture.

In any case, regardless of which step happens to be limiting, the higher the machine operating speed the more economical the production of corrugated board becomes.

In most corrugating machines in use today the unused adhesive is recirculated constantly between the point of application and a supply tank. Typically the applicators in such machines comprise an applicator roll which rotates with a portion of its circumference immersed in the recirculating bath of adhesive. A film of adhesive is picked up on the applicator roll which film is then passed through an adjustably preset gap formed between a contra-rotating wiper roll and the rotating applicator roll. Notwithstanding the constancy of the thickness of the film of adhesive thus delivered to the point of application, the amount of adhesion will vary markedly with the viscosity of the adhesive. In the case of starch-based adhesives moreover, if the viscosity of the adhesive drops too far, the amount of glue transferred to the flute tip of the medium by the applicator roll will be reduced to the point where the quantitative as well as the qualitative delivery of the adhesive will be compromised, with the result that a poor or even totally unsatisfactory bond is formed between the liner in question and the medium ply. Accordingly, a stable viscosity profile is a highly desirable attribute in adhesive compositions.

Unavoidably the work input to the recirculated adhesive composition is necessarily high. It is essential that the glue does not cool, otherwise the set-back characteristics of traditional starch adhesives results in retrogradation, which may in turn go so far as to result in the formation of an unworkable thixotrophic gel. Moreover, a high rate of adhesive recirculation is necessary to prevent local overheating of the adhesive residing in the applicator bath and in order to avoid local and premature gel formation in the applicator machinery. At the same time, the work input necessarily includes a certain shear component which disintegrates the soft, swollen, highly hydrated starch granules. The resulting subdivision of the over all gel structure of the adhesive invariably results in a marked reduction of the adhesive's viscosity. This problem is known to be further compounded by temperature and alkali effects.

Accordingly, an ideal starch adhesive should:
1. have a stable viscosity profile which remains relatively unaffected by working in general and by shear effects in particular, as well as being unaffected by temperature variations and high levels of alkalinity;
2. tend to resist retrogradation; and
3. rapidly form strong green bonds.

Most commercial starch adhesives in use today are of the Stein-Hall type. These adhesives were introduced in the 1930's and are described for example, in U.S. Pat. Nos. 2,051,025 and 2,102,937. Typically a Stein-Hall adhesive comprises about 80% by weight of raw starch granules suspended in water, with the balance of the adhesive being predominately a "carrier" component. Conventionally, the carrier comprises an extremely viscous cooked or gelatinized starch solution, the primary functions of which are to hold the raw starch in suspension and to increase the viscosity of the admixture to the degree required in each particular instance so as to ensure that sufficient adhesive can be picked up by the applicator roll and applied using the conventional means described above. The viscosity of the final adhesive is, of course, regulated by varying the amount of carrier in the mixture.

Caustic soda is often used in Stein-Hall adhesives to lower the gelatinization temperature of the raw starch portion and to gelatinize the carrier starch. Borax is also used in these adhesives to increase the viscosity or body, viscoelasticity and tack of the adhesive. Urea has also been considered as a partial replacement for one or both of the above—see U.S. Pat. No. 4,157,318.

The two principal components of the system are mixed separately with the carrier being prepared in a primary or carrier mixer. From this primary mixer the prepared carrier is passed to either a secondary mixer wherein the raw starch slurry has been prepared, or to the main mixing tank into which the raw starch slurry is also pumped. In any case, the two components are admixed, and then recirculated to and from the adhesive bath in which the applicator roll is partially immersed. The adhesive is applied to the flutes of the medium and the single facer liner ply is brought into contact therewith under pressure and heated. The heating of the resulting corrugated composite to the gelation temperature, the raw starch component absorbs water which causes a rapid increase in the viscosity of the adhesive composition to form a green bond. This "in situ" gelation and subsequent dehydration of the adhesive establishes a permanent bond between the liner and the medium ply.

Optimum performance characteristics required by Stein-Hall adhesives utilizing conventional starch-based carrier compositions are well established in the art:
1. the adhesive must have a gel point of 138° F. to 155° F.;
2. Stein-Hall viscosities of between 25 and 60 seconds are preferred;
3. the starch to water ratio should be about 1 to about 3.3 to 5.6, with total solids ranging from about 18% to 30% by weight; and
4. the carrier starch to raw starch ratio should be of from about 1 to about 5.

It is well appreciated in the art that these specifications represent the best compromise between the Stein-Hall viscosity and the total solids content of any given adhesive using conventional starch-based carrier compositions.

It is also known that adhesives having a total solids content ranging upwards from about 1½ to 2 times the total solids content of Stein-Hall adhesives using conventional, high viscosity starch carriers, can be achieved using high amylose starches, (about 80% amylose), as a carrier. The lower inherent viscosity of high amylose starches permits a much higher total solids content than is possible in conventional Stein-Hall adhesives using the more typical, highly viscous carriers. The higher solids content is known to improve the green bond characteristics of the adhesive, since there is less free water to be evaporated following in situ gelation. Moreover, the permanent bond is much more rapidly established. While such adhesives are technically superior in their performance to conventional Stein-Hall adhesives, they can only be economically produced from special high amylose corn hybrids and the cost of the final adhesive is thereby increased three to four fold over the conventional adhesives. Other means for securing high amylose starches are known in the art, for example, U.S. Pat. Nos. 2,779,693 or 2,822,305, although these are considered prohibitively expensive in the manufacture of starch adhesives—see U.S. Pat. No. 4,343,654. Speciality high amylose carriers for Stein-Hall adhesives are usually sold for applications which require water proof bonds. These specialty carriers typically include synthetic resins to enhance their wet strength bond characteristics and are economically feasible in this application because conventional carriers having such waterproofing resins require much longer curing times and thereby limit machine speeds down to about 150 linear feet per minute in order to facilitate setting of the adhesive, whereas high amylose carrier based adhesives allow machine feeds of up to about 600 linear feet per minute. Also, the alignment of the amylose molecules results in improved permanent bonds. However, in addition to their cost, the very nature of high amylose starch carriers suggests a potential for a pronounced set-back character. (See Starches and Corn Syrups—Dr. A. Lachmann—1970, Noyes Data Corporation at pg. 262 and Wheat: Chemistry and Technology: 2nd ed. edited by Y. Pomeranz pg. 341-342). Such adhesives should therefore be heated and agitated under relatively rigorous conditions to avoid the retrogradation problems which might otherwise arise out of the tendency for linear amylose molecules to establish extensive networks of intramolecular hydrogen bonds. While this requirement for constant working is met while the board making process is running, the requirement could be a problem if the adhesives were permitted to stand, for example, over night, on weekends, holidays, or over other plant shutdown periods.

One attempt at overcoming these retrogradation problems while at the same time providing a starch based carrier for Stein-Hall type corrugating adhesives is described in U.S. Pat. No. 3,912,531. In this patent, carrier compositions are described which are based on waxy corn hybrids having between 95% and 100% amylopectin starches. Acid modification of these starches is used to reduce the inherent viscosity of the carrier to a point which, like the low inherent viscosity of the high amylose starches, will permit a high total solids concentration in the final adhesive. The retrogradation problem of high amylose starches is not likely to be encountered in high amylopectin starches, owing to the high molecular weight and extensively branched structure of the amylopectin molecules. Intramolecular hydrogen bond formation in these waxy starches does not tend to form a thixotrophic gel as readily as do carriers based on high amylose starches. Notwithstanding the avoidance of retrogradation problems, carriers based on starches consisting of 95–100% amylopectin are available only through cultivation of special waxy hybrids and extraction processes described in, for example, U.S. Pat. Nos. 2,779,693 and 2,822,305.

In summary, the approach to the production of high amylopectin and high amylose starches has, historically, taken one of two routes:
1. genetic development of specialized hybrid strains; and,
2. chemical, differential precipitation of the amylose and amylopectin fractions from whole starch.

A more detailed history can be found in Starches and Corn Syrups—1970, by Dr. A. Lachmann, a Noyes Data Corporation publication, on page 249. It is sufficient for the present purposes to say that the production of high amylose hybrids have been successful to the extent that hybrid strains containing up to 75-80% amylose, have been reared as sources of high amylose starches suitable for use in the corrugating adhesives industry. The cost considerations pertinent to the limited applications in which the use of such products is economically feasible has already been discussed. The genetic programs aimed at the development of a high amylopectin hybrid (waxy maize) have not yielded cost effective results in terms of the suitability of their starches for use in corrugating adhesives applications, in view of the cost incurred in growing and processing such hybrids as have been developed. Starches produced from these high amylopectin hybrids are relatively costly, and are used mainly as modified food grade starches, where the quality of such starches commands a high enough price to meet the higher production costs. Also, and despite the substantial number of early patents which issued for chemical methods of separating the respective fractions from whole starches, U.S. Pat. No. 2,779,693 and U.S. Pat. No. 2,822,305 among them, such fractionation methods were faced with problems arising out of the protective colloid effect of the amylopectin fraction on the amylose fraction, which impedes selective precipitation of the latter. Under more rigorous conditions co-precipitation of the two fractions ensues and as a consequence commercial scale separation is not achieved in any economically significant degree. Both pure amylose and pure amylopectin are, however, available from the Dutch potato starch industry in commercial quantities. The pure amylose fractions, however, are not useful in the corrugating adhesives industry. The pure amylopectin fractions are useful mainly in the production of instant food products, and are not believed to be in current use in the corrugating adhesives industry. Moveover, the "steric hinderance" effects of the highly branched amylopectin molecules interferes with the formation of strong green and permanent bonds. That notwithstanding, however, the amylopectin fraction might still be useful as a specialty high solids carrier in those special and limited circumstances where the need for its special characteristics would out-weigh its cost. Hence, beyond the specialized applications set out hereinbefore, the solutions of these methods have not presented advantages which are broadly applicable to the corrugated paper board industry.

Attempts at using less esoteric, ordinarily available starches to produce high solids Stein-Hall type corrugating adhesives have included the use of acid modified ordinary starches. These are discussed for example, in TAPPI, Vol. 42, No. 3, March 1959, beginning on page 204 under the heading Low Viscosity Starches in an article by Scallet and Sowell of Anheuser-Busch Inc. It is known however, (see, for example, U.S. Pat. No. 3,475,215, Col. 1, beginning at line 69) that acidic modifications of such ordinary starches result in adhesives with insufficient adhesive strength, owing to the random nature of the acid hydrolysis. Not surprisingly, the random attack of the acid also aggravates the set-back character of the adhesive (see Wheat Starch and Gluten and Their Conversion Products, J. W. Knight, 1965, Leonard Hill, London—page 60).

The process of U.S. Pat. No. 3,475,215 attempts to solve this problem by further modifying a catalytically acid modified, "ordinary" starch with an oxidative treatment step. The theory on which the process of that patent is based assumes that the oxidizing agent disassociates into hydroxyl-free radicals which are then free to react with the hydroxy groups of the starch molecule to yield an oxidized starch. The tendency of the thus treated starch to undergo retrogradation is minimized since the treated molecules carry a net negative charge and hence tend to repel one another rather than to establish intermolecular hydrogen bonds. Notwithstanding the advantages of the tandem acid hydrolysis-oxidation process, the process described in U.S. Pat. No. 3,475,215 advocates the careful selection of the acid catalyst, in order to avoid one which gives rise to low pH and therefore supports the above-mentioned random hydrolysis of the starch molecules down to sugars which have no adhesive characteristics.

U.S. Pat. No. 4,343,654 introduces an oxidative process for producing a low viscosity carrier from ordinary starches while at the same time avoiding the problems associated with the random hydrolysis that results from attempts at acid modification. While the starches useful in this process contain a substantial amylopectin content of between about 70% and 80%, they are not necessarily high amylopectin starches within the meaning set out in U.S. Pat. No. 3,912,531 and as is otherwise generally defined in the art. Rather the amylopectin content of the starches useful in the practice of the process described in U.S. Pat. No. 4,343,654, are those more typically produced from ordinary milo, wheat, tapioca, buckwheat, barley, oat or other such grains. Unlike the process described in U.S. Pat. No. 3,475,215, this process relies on the production of peroxide ions in the free radical oxidation mechanism and does not utilize an acid modification step. The oxidizing agent used in the process therein described is hydrogen peroxide. The use of such a reagent entails both price and inventory control problems for the paper board manufacturer. According to Starches and Corn Syrups—1970, by Dr. A. Lachmann, a Noyes Data Corporation publication, oxidation treatments carried out, in an alkaline environment without acid modification, utilize large amounts of both oxidant and buffer when the high solids slurries, necessary to make the conversion economic, are treated. Moreover, the product is often off-coloured. If cooking times are reduced to avoid these problems, retrogradation becomes a significant short-coming in the carrier so produced.

Improvements in conventional high inherent viscosity carriers useful in Stein-Hall corrugating adhesives have been realized through the use of small granule "B" starches derived from wheat. Unlike the "B" starch fractions mentioned in the above-identified Noyes Data Corporation publication (see page 249), the term "B" starches as used in relation to the modern wheat starch industry and elsewhere in the balance of the instant specification, including the claims, is not necessarily a reference to any amylopectin rich fraction of native wheat starch. Rather, the term is used here in reference to the crude, lighter weight starch fraction containing the smaller-sized starch granules obtained by differential centrifugal sedimentation of the bimodally size-distributed population of starch granules found in regular or native wheat starches. This sedimentation does not depend on a precipitation reaction. Moreover, such "B" starches are not necessarily "high" (i.e. 95%–100%), in amylopectin. In fact, these "B" starches are more typically characterized as having amylopectin concentrations comparable to "ordinary" starches and comprising in the range of from about 50 to 75% amylopectin. The separation of "B" starches from native wheat starches is described for example, in UK Nos. 682,527; 1,397,370; CA No. 1,129,816; U.S. Pat. Nos. 2,642,185; 3,901,725; and, 3,951,948. Canadian Pat. No. 1,106,106 discloses improvements relating to starch-based carriers useful in Stein-Hall corrugating adhesives, which improvements derive through the use of an unmodified "B" starch described as comprising small granule wheat starch having granule diameters of generally less than 10 microns, and usually in the range of 2 microns to about 6 microns, from 1 to 8% wheat pentosans and from about 1% to 10% proteins. That disclosure was based on the realization that the water-binding capacity and the very high inherent viscosity of the unmodified "B" starch allowed such starches to be used effectively in the production of viscosity increasing and stabilizing, but unmodified, Stein-Hall carriers useful at raw starch to carrier starch ratios as high as 9:1 in the adhesive admixture. The high inherent viscosity of carrier formulations based on these unmodified "B" starches, however, does not permit the use of high solids concentrations in the Stein-Hall adhesive formulations. Moreover, while the viscosity profile of such carriers is very stable, the initial viscosity of the carrier cannot be controlled and batch to batch variations in initial viscosity of the Stein-Hall adhesive cover the range of from as low as 20 seconds up to about 100 seconds for a given solids concentration. Since the viscosity specification of the product is so variable the corrugating machinery must be adjusted each time a new batch of carrier is used. Clearly this entails adjustments of the operating speed, the gap between the wiper and applicator rolls and/or an adjustment in the raw starch to carrier starch ratio so as to ensure that good bonds are formed in the corrugated board.

It is an object of the present invention to provide an acid-treated, hydrolytically modified wheat "B" starch useful as a carrier component for Stein-Hall type adhesives.

SUMMARY OF THE INVENTION

Surprisingly, and this finding forms the basis of the present invention, it has been found that acid modification of wheat "B" starches permits the production of high solids carriers having highly stable viscosity profiles notwithstanding prior expectations to the contrary. The acid modification of the wheat "B" starch does not show any evidence of having a pronounced setback character such as is usually associated with acid-modified wheat starches as noted above.

Moreover, the prior art teaches that without special acid modification techniques, high protein, fibre or ash concentrations in the starch could, following acid-modification, result in low quality corrugating adhesives. (See U.S. Pat. No. 3,479,220 column 1, the sentence bridging lines 48 through 52.) Yet notwithstanding the high residual protein, fibre and ash content of wheat "B" starches, relative to wheat "A" starches for example, the acid-modified wheat "B" starch of the present invention has, surprisingly, been found to be very useful as a Stein-Hall carrier in corrugating adhesive formulations even when aqueous slurry techniques are used to accomplish the acid modification.

The acid modification further permits control over the initial viscosity of the carrier component, which in turn permits close adherence to product specifications without any significant batch to batch variation in the initial viscosity of the carrier.

The acid-treated, hydrolytically modified wheat "B" starches of the present invention are especially useful as carriers for Stein-Hall corrugating adhesives which, in turn, are particularly suitable for use in the production of water-resistant board, such as poultry, meat and vegetable board. Moreover, carrier compositions of the present invention have been found to have substantially less "false body", a property which carries with it substantial advantages in the preparation of the complete Stein-Hall adhesive. The present starches may also be used in "no-carrier" adhesive applications. In accordance, therefore, with one aspect of the present invention there is provided an acid-treated, hydrolytically modified wheat "B" starch.

Wheat "B" starches are also known in the art as second grade starches and comprise starch granules wherein the average granular diameter is generally less than about 15 microns and wherein typically, most of such granules range between about 2 and 10 microns in diameter. While such starch granule size distributions are inherent to wheat "B" starches, the advantages of the present invention are not essentially contingent on the reduced average particle size of the wheat "B" starch. Similarly, the protein content of the wheat "B" starch—which ranges generally up to about 10% by weight on a dry basis—is also not strictly essential to the realization of an improved carrier composition of the present invention although, and this is particularly the case where the modification of the starch does not substantially interfere with the protein's integrity, such wheat proteins can act as humectants in the carrier composition and improve its overall tack.

In addition, wheat "B" starches can also contain up to about 15% by weight on a dry basis of complex carbohydrate hemicelluloses known as wheat pentosans. The concentration of wheat pentosans in a wheat "B" starch is most typically about 3% to 10% by weight on a dry basis, usually about 4% to 8% and generally between about 1% and 10%. Regular "ordinary" or native wheat starches usually contain about ½% by weight, on a dry basis, of wheat pentosans. What is perhaps more pertinent to the present invention is that a wheat "B" starch will always contain a greater concentration of such pentosans and similar materials which are also indigenous to wheat starches generally, than will the corresponding regular wheat starch from which the "B" starch is derived.

The enchanced lyocratic character of aqueous dispersions of wheat "B" starches combined with the modification thereof to produce the reduced viscosity wheat "B" starch of the present invention, result in the surprisingly enhanced performance of carrier compositions based on such modified wheat "B" starches, not just relative to unmodified wheat "B" starches or other commercially available wheat starch carrier compositions but also in relation to high performance/high cost specialty carriers based on starches derived from high amylose corn hybrids.

During the preparation of a carrier composition useful in Stein-Hall adhesives, the carrier starch is mixed with water and the slurry is heated to a preparation temperature and caustic soda is added to the mixture. Such mixtures are possessed of a characteristic referred to in the art as "false body" which has to be "sheared down" before the carrier is useful in formulating a Stein-Hall adhesive. Carrier compositions of the present invention, however, and particularly those based on acid modified wheat "B" starches have only a slight tendency towards "false body" and hence do not require as much shear as do carriers based on regular starches. More importantly, however, a lower preparation temperature can be used in preparing carrier compositions based on starches of the present invention because the carrier composition is readily "cooked out" (i.e. it reaches a stable viscosity in the carrier preparation tank at a much lower temperature than do regular starches which require to be heated to about 130° F. to 140° F. in order to stabilize their viscosity through the elimination of their false body). In contrast thereto, carrier compositions of the present invention need only be heated to between 80° F. and substantially less than 130° F. and preferably, about 110° F. in order to "cook out" the false body associated with these novel starches. This is of extreme importance not only as a consequence of the energy which can be saved but also because the final adhesive composition, i.e. the mixture of the carrier and raw starch portions, has to have a temperature of about 103° F. (100° F. to 105° F.) and accordingly, the caloric contribution of the carrier portion, especially in warm climates or where only warm recycled water is available for hydrating the raw starches, the desired 103° F. temperatures are difficult to achieve if the carrier has to be heated to between 130° F. and 140° F. in order to stabilize its viscosity.

Therefore, having regard for these findings and the surprising nature of the improvements flowing from the combined effect of the viscosity reduction and the "enhanced" lyocratic character of wheat "B" starch, there is provided by way of another aspect of the present invention, an acid-treated, hydrolytically modified wheat starch whereby because of that modification, cooked aqueous dispersions of the said modified starch have a reduced viscosity relative to a corresponding unmodified wheat starch, said modified wheat starch also including an increased concentration of those non-proteinaceous, non-starch materials which are indigenous to a corresponding regular starch, said increased concentration being relative to said regular starch.

The reduced viscosity of the aqueous dispersion of said wheat starch should not be less than about 12 centipoise—grams per cubic centimeter, as measured on a NAMETRE ™ viscometer, model No. 7.006. This viscometer is available from the Nametre Company, New Jersey, U.S.A. The procedure used in determining the viscosity of such aqueous dispersions is as follows:

A 15/1 water-to-starch weight by weight mixture is prepared, mixed with one or two drops of L61 PLURONIC ™ defoamer, neutralized and heated from ambient to 93° C. in a boiling water bath. The sample is then held in the bath for an addition 30 seconds to cook the dispersion and then cooled to 36° C. in a cold water bath. If necessary, the original weight of the sample must be re-established by adding water to make up for any evaporative losses. If additional water is added, then the temperature of the sample should be adjusted, in the cold water bath, to 33° C. after the additional water is thoroughly admixed with the sample. The viscometer is 0 calibrated and the sample is put in place. The range selector of the viscometer is then set to $10^3$ and a reading is taken after 1 minute. All viscosities mentioned in this specification, including the claims, and which are not specifically set forth as Stein-Hall viscosities or otherwise specified, have been measured according to the above procedure.

* L61 PLURONIC ™ defoamer is a long chain alcohol based antifoam agent available from BASF, Germany.

Modified wheat starches having viscosities of less than about 12 centipoise—grams per cubic centimeter, are not desirable as carrier compositions for use in Stein-Hall adhesives, in part because the concentration of low molecular weight dextrins interferes substantially with the carriers' performance.

Moreover, while wheat starch is preferred, other starches such as those derived from legumes, e.g. pea starches, or those derived from cereals such as rye or barley (starches from which are also bimodally distributed with respect to size) which have indigenous, non-protein, non-starch materials having a hydrophilic colloidal character similar to those found in wheat, may be used herein. Cereals such as corn, however, do not have any significant concentrations of such materials and accordingly, cannot be employed as a substitute for wheat for the purposes of the present invention, although in keeping with normal industry practice, any cereal, legume or even root starch may be used as the raw starch portion in Stein-Hall adhesive formulations wherein the carrier component is a viscosity-reduced starch produced in accordance with the practice of the present invention.

It will be appreciated that any increase relative to corresponding regular starches, in the concentration of those aforesaid non-proteinaceous, non-starch materials (wheat pentosans being principal among them) in said modified wheat starch will necessarily result in a corresponding increase in the lyocratic character of aqueous dispersions of the modified wheat starch. In the context of currently prevalent commercial practices, such an increase is perhaps most readily and economically achieved through hydrodynamic centrifugation in hydrocyclones of slurries of regular wheat starches. Such techniques are widely known and usually associated with production of wheat "B" starches (see, for example, U.S. Pat. No. 2,642,185). Other means for producing such modified wheat starches will, however, occur to those skilled in the art in light of the present disclosure. For example, other more traditional centrifugal separators, as distinguished from hydrocyclones, may also be used to produce wheat starches and wheat "B" starches in particular, having increased concentrations of the above-mentioned materials. Air classification techniques may also be employed. Some of the applicable techniques are summarized in more detail in Wheat Starch and Gluten and Their Conversion Products by J. W. Knight, Leonard Hill Publishers, London, 1965, Chapter 1 of which is herein incorporated by reference.

Notably, when air classification techniques are utilized to fractionate pea flour, for example, the fractionation process inherently results in a significant amount of large granule starch being removed along with the protein. This results in the remaining starch having what is in effect an "increased" concentration of indigenous non-proteinaceous, non-starch hydrophilic colloids, without further classification of the starch being required. In this regard it will be appreciated that such an application of air classification techniques differs from the typical present-day hydrodynamic starch classification techniques which, for economic reasons, are run so as to produce distinct grades of starch plus a separate protein fraction. Of course, hydrodynamic classification processes can be altered to achieve the same effect as the air classification techniques merely by altering the "cut off" point in a manner that will be readily understood by a man skilled in the art in light of the teachings of the instant specification.

It has also been realized that while acid treatments, and dry acid treatments in particular, are the preferred means for hydrolyzing the wheat starches in the present invention, the same effect can be accomplished by way of enzymatic hydrolysis of the starch. Similarly, the viscosity of the starch may also be reduced by any of the well known variations of oxidizing treatments or even by way of the viscosity-reducing, cross-linking treatment mentioned in TAPPI, Vol. 42, No. 3, March 1959 on page 204. Each of these techniques is well understood in the art and need not be reiterated herein.

In accordance therefore with a broad aspect of the present invention, there is provided a novel, modified starch selected from one of the group consisting of wheat, barley, rye and legume starches wherein said modified starch has a reduced viscosity relative to a corresponding unmodified starch of not less than about 12 centipoise—grams per cubic centimeter, and an increased concentration of those non-proteinaceous, non-starch materials indigenous to a corresponding regular starch, relative to said regular starch.

The present invention also relates to a carrier composition and a high solids Stein-Hall adhesive composition and processes for preparing same based on such novel, modified starches. In addition, the present invention also encompasses improved corrugated paper board products having improved wet strength characteristics wherein said products comprise at least one liner ply and one medium ply which are joined together by adhesive compositions consisting essentially of the above-mentioned modified starches.

In accordance with one method for producing carrier compositions of the present invention, there is provided a process comprising the steps of:

Mixing the carrier starch with water to produce a slurry, heating the slurry to a preparation temperature and adding caustic soda thereto and agitating the resulting mixture to shear down its false body, the improvement comprising utilizing as a carrier starch in this process, a modified, second grade starch selected from one of the group consisting of wheat, barley, rye or legume starches which modified second grade starch contains an increased concentration (relative to a corresponding regular starch of the same type) of non-starch, non-protein, hydrophilic colloids indigenous to the selected starch type;

wherein aqueous dispersions of said modified starch have reduced viscosities relative to comparable aqueous dispersions of the corresponding regular starch, that reduced viscosity not being less than about twelve centipoise grams per cubic centimetres for a precooked fifteen to one water to modified starch dispersion at between 33° C. and 36° C.; and wherein the preparation temperature is substantially less than about 130° F. and not less than 80° F. Preferably the preparation temperature is about 110° F.

There is also provided a process comprising the steps substantially as set forth in the preceding paragraph and further including the steps of adding additional water, raw starch and borax to the aforementioned carrier to produce a Stein-Hall adhesive composition.

Moreover, the present invention relates to a process for producing a modified starch wherein said process comprises the steps of fractionating a regular starch selected from one of the group consisting of wheat, barley, rye or legume starches, into a prime starch fraction and a second starch fraction containing an increased concentration of non-starch, non-protein hydrophilic colloids indigenous to said regular starch and relative to said regular starch and modifying said second starch fraction to produce a modified starch wherein aqueous dispersions of said modified starch have reduced viscosities relative to comparable aqueous dispersions of a corresponding regular starch, said reduced viscosity not being less than about 12 centipoise grams per cubic centimeter for a precooked 15/1 water to modified starch dispersion at between 33° C. to 36° C.

It will, of course, be understood that the terms "regular", "native" or "ordinary" starches refer to high purity commercially produced prime starches that are derived, along with a separate vegetable protein fraction, from the treatment of a corresponding flour in industrial processes utilized for separating prime starches and gluten or other vegetable protein from such flours.

DETAILED DESCRIPTION

The scope of the foregoing summary notwithstanding, it will be appreciated that by far the most commercially significant aspects of the present invention are to be realized in accordance with the use of wheat "B" starches generally and particularly in accordance with the practice of the preferred embodiments as set forth later in the instant disclosure. The following remarks are relevant in this regard.

Firstly, of the cereal starches mentioned above as being suitable for use in the present invention, only wheat starch is presently available in commercially significant quantities and at reasonable processing costs for use in the manufacture of starch-based, corrugating adhesives. Legume starches are not presently available in sufficient commercial quantity for supplying all of the corrugating adhesive industry although "air classified" pea starch is otherwise advantageous, having regard for its increased concentration of indigenous, non-starch, non-protein, hydrophilic colloids. As to barley and rye starches, the relatively high processing costs currently associated with these materials makes their adoption at the present time rather unlikely.

Secondly, wheat "B" starch is, in a manner of speaking, a by-product of the manufacture of wheat "A" starch. Certainly, there has been a long-felt want in the starch industry for higher value-added markets for wheat "B" starches. Since both "A" and "B" starches are produced in quantity in modern wheat processing plants, wheat "B" starch is already available in good commercial supply without any need for alteration of either processing equipment or, in most cases, manufacturing practices.

Thirdly, the presence of protein in the wheat "B" starch has not proven to be disadvantageous, and particularly so when the starch is dry acid-modified. Also, the presence of the elevated protein concentration of wheat "B" starch has been found to improve tack characteristics and the water-holding capacity of carriers based on, for example, dry acid-treated, hydrolyzed wheat "B" starches. There also exists some basis for believing that the protein present in the "B" starch may interact favourably with water-proofing resins in Stein-Hall adhesives used to manufacture water-resistant boards such as poultry board.

Other advantages of this aspect of the present invention will occur to those skilled in the art in view of the present disclosure.

While the skills required to carry out the viscosity reduction mentioned hereinbefore are already well established in the art for each of the aforementioned means, i.e. acid hydrolysis, et cetera, the following is a detailed description of a dry acid, hydrolytic modification of wheat "B" starch.

A preferred starting material is a wheat "B" starch having an average starch granule size of less than 15 microns with a typical starch granule being between 2 and 10 microns in diameter. The natural wheat pentosan concentration generally ranges between 4% and 10% by weight on a dry basis although it may range between 1% and 15%. The protein concentration is up to about 10% but generally ranges between about 2% and 5% by weight on a dry basis. The wheat "B" starch may also contain some bran material although usually not more than about 5% by weight on a dry basis. The wheat "B" starch exits a hydrocyclone slurry separation process at generally between about 15% and 25% solids. The slurry is then passed to a spray dryer and thereafter the spray dried wheat "B" starch is ready for hydrolytic modification. It will be appreciated that the pH of wheat "B" starch normally ranges between about 2.8 to 4.0 and that freshly dried wheat "B" starches may have pH's ranging upwardly to about 5.4.

If desired, therefore, the dried wheat "B" starch is then thoroughly mixed in the presence of a gaseous acid to acidify the starch to within a preferred pH range of 2.5 to 3.5. Lower pH's greatly accelerate the hydrolytic modifications of the starch granules especially when carried out at elevated temperatures but are much harder to control Higher but still acid pH's require longer periods of time to complete the hydrolytic modification. A pH of about 3.1 is most preferred. Any gaseous acid or indeed any acid (i.e. wet or dry) may be used for the purposes of adjusting the pH.

The wheat "B" starch mixture is then heated, preferably to within the range of 200° F. to 340° F. Temperatures lower than 200° F. and even ambient temperatures can be used although the reaction time is correspondingly lengthened. At temperatures of about 250° F. and under relatively mild acid conditions, some repolymerizable dextrins are formed which, on repolymerization produce a stabilization within the starch granule microstructures which also results in an increase in the adhesives' viscosity stability. At temperatures higher than 340° F., browning occurs although as will be appreciated by those skilled in the art, "short contact time" reactors such as, for example, extruders and certain types of fluid bed reactors, would permit very high temperatures to be used (i.e. up to 500° F.). A preferred temperature range is about 230° F. plus or minus 30° F. which results in a reaction time, at the preferred pH's, of about 3 to 10 hours depending on the extent of the hydrolytic modification desired. Clearly, of course, the overall reaction time will depend on a combination of the pH and temperatures that are selected, as will be appreciated by those skilled in the art.

The following table summarizes certain combinations of pH, temperature and time in terms of final viscosity of the resulting acid-modified wheat "B" starch of the present invention:

TABLE 1

| | Dry Acid Modified Wheat "B" Starch | | | | | | |
|---|---|---|---|---|---|---|---|
| Batch # | 1 | 2 | 3 | 4 | 5 | 6 | 7 |
| pH of Reaction | 3.20 | 3.15 | 3.15 | 3.15 | 3.15 | 3.15 | 3.15 |
| Reaction Temp. | 230 | 233 | 230 | 222 | 225 | 243 | 220 |
| Reaction Time(hr) | 7 | 5 | 5 | 6 | 6 | 4 | 6 |
| (min) | 20 | 25 | 30 | 45 | 15 | 45 | 20 |
| Final Product Viscosity (centipoise-grams/cc) | 23 | 22 | 24 | 23 | 20 | 20 | 20 |

The hydrolysis modification of the starch is continued until such time as the viscosity of sample slurries begins to approach the viscosity that is desired in the final product. The reaction is then stopped either by cooling the mixture or by neutralizing it with the addition of, for example, $NH^3$ gas. As will be readily apparent to a man skilled in the art, all hydrolysis reactions which take place at ambient temperatures must be neutralized by way of the addition of a basic reagent, otherwise the starch will in time be reduced to dextrin materials and the viscosity will fall correspondingly.

The viscosities of the modified starches of the present invention will range generally between 12 and 80 centipose-grams per cubic centimeter. In the case of hydrolytically modified wheat "B" starches, those having viscosities in the range of 80 down to 27 centipose-grams per cubic centimeter, will show correspondingly greater improvements over unmodified wheat "B" starches as carriers for Stein-Hall corrugating adhesives. Modified wheat "B" starches having viscosities in the range of 13 to 27 centipose-grams per cubic centimeter are preferred and those having viscosities in the range of 18 to 25 centipoise-grams per cubic centimeter are especially preferred. Once the hydrolytic modification is complete and the reaction is effectively stopped, the modified starch may be packaged for distribution and sale or stored for later use in a Stein-Hall corrugating adhesive composition.

In addition to dry acid modifications, wet acid modifications may also be carried out. In such a wet acid modification, the wheat "B" starch as obtained from, for example, a hydrodynamic centrifugation process, takes the form of a slurry having between about 15% to 25% solids. This slurry is then acidified at temperatures of between 20° C. to 40° C. by way of the addition of an acid, down to a pH of between about 1 to 2.5. The reaction is then permitted to proceed until the desired viscosity is reached and then the mixture is neutralized with caustic soda or other alkali in an amount sufficient to stop the hydrolysis reaction. Generally this will entail raising the pH to between about 3 to 7. The slurry is then spray dried and, as with the dry acid modified product, is then ready for packaging, distribution or storage.

EXAMPLE 1

The following procedure represents the preferred practice under the present invention.

9000 pounds of wheat "B" starch is transferred from a storage bin to an acidifier-blender reactor. (Minor amounts of regular or "A" starches may be admixed with the "B" starch if desired.) This reactor comprises a closed cylindrical shell containing a helical blade arrangement which is rotatable about the longitudinal axis of the cylindrical reactor, on a central longitudinally extending rotatable shaft. The blades are arranged such that they have a minimal clearance from the cylindrical wall of the reactor. The reactor is also adapted to permit the metered addition of a gaseous acid to the contents of the reactor. The pH of the wheat "B" starch is then adjusted, if necessary, using aqueous hydrocloric acid to obtain a pH of between 3.0 and 3.3. If the addition of the gas is found to be necessary, the starch and the gas are blended for at least 1 hour in this reactor. Once thoroughly blended, the mixture is then transferred to a roaster-blender reactor. This second reactor is substantially the same as the first except that the second is thermally jacketed and thereby adapted for heat transfer between a recirculating heat transfer medium, in this case, hot oil at 310° F., and the contents of the reactor. The second reactor also provides a recirculating air flow through the acidified wheat "B" starch to provide for moisture removal during heating. The temperature of the wheat "B" starch is raised to 230° F. plus or minus 30° F. in this reactor. Periodic sampling is carried out to determine the progress of the hydrolytic modification on the wheat "B" starch and when the modification approaches completion, i.e. when the desired viscosity (i.e. of about 18 to 25 centipoise grams per cc) is almost reached, the acid-treated, hydrolytically-modified wheat "B" starch is transferred to a third reactor. This third reactor is similar to the second except that it is not necessarily adapted to provide for a recirculating air flow and the heat transfer medium conducted through the thermal jacketing is cold water. It is in this third reactor that the hydrolytically-modified wheat "B" starch is cooled to retard, and eventually to effectively stop, the hydrolytic reaction. Where a more rapid cessation of the reaction is made necessary by the nearness of the mixture to its desired final viscosity, stochiometric quantities of ammonia gas may be added to neutralize the reaction. Following cooling, the product is ready for packaging, distribution and sale.

It is to be noted that the above-mentioned arrangement of three separate sequential reactors enhances product through-put and hence is more economic than is a single multi-purpose reactor operation. That notwithstanding, however, such single reactors may be employed. Commercially available reactors of this latter type include the Blattman Dextrinizer and the Patterson Dextrinizer. Other well-known reactors such as double cone reactors or twin shell reactors may also be employed in the practice of the present invention. Moreover, it is also contemplated that fluidized bed reactors, particularly under positive pressure, may be employed to achieve dry modification of the wheat "B" starch.

EXAMPLE 2

The following study was carried out to determine the effect of differing concentrations of caustic soda on the viscosity stability of a dry acid treated, hydrolytically-modified wheat "B" starch of the present invention. Six identical dispersions of the modified wheat "B" starch in water were prepared by admixing 520 milliliters of water with 60.5 grams of modified wheat "B" starch and heating the mixture to 130° F. as summarized below in Table 2. Each of the 6 samples was then admixed with an amount of caustic in the range of 5 to 14 grams, as indicated in Table 2. The mixture was then agitated at 600 rpm and the Brookfield viscosity at 103° F. was measured on a Brookfield Viscometer for each of the 6 samples. The viscosity was measured again after 24 hours and these results too are summarized in Table 2.

TABLE 2

Effect of Caustic on Modified Wheat "B" Starch

| | 1 | 2 | 3 | 4 | 5 | 6 |
|---|---|---|---|---|---|---|
| Water (ml) | 520 | 520 | 520 | 520 | 520 | 520 |
| Modified Wheat "B" Starch (g) | 60.5 | 60.5 | 60.5 | 60.5 | 60.5 | 60.5 |
| Heat to (°F.) | 130 | 130 | 130 | 130 | 130 | 130 |
| Caustic (g) | 5 | 6 | 8 | 10 | 12 | 14 |
| Mix at 600 RPM (min) | 15 | 15 | 15 | 15 | 15 | 15 |
| Viscosity at 103° F. (centipoise) | 500 | 380 | 400 | 435 | 450 | 420 |
| Viscosity 24 hours (centipoise) | 460 | 390 | 390 | 430 | 420 | 390 |

As can be seen from the above summary, the viscosity stability of the modified wheat "B" starch remained relatively stable notwithstanding the wide variations in the differing caustic treatments.

EXAMPLE 2(b)

The following study was carried out to determine the effect of differing concentrations of caustic soda on the viscosity stability of a dry acid treated, hydrolytically-modified, air-classified pea starch of the present invention. Six identical dispersions of the modified pea starch in water were prepared by admixing 500 milliliters of water with 88 grams of modified pea starch and heating the mixture to 140° F. as summarized below in Table 2(b). Each of the 6 samples was then admixed with an amount of caustic in the range of 10 to 28 grams, as indicated in Table 2(b). The mixture was then agitated at 600 rpm and the Brookfield viscosity at 103° F. was measured on a Brookfield Viscometer for each of the 6 samples. The viscosity was measured again after 24 hours and these results too are summarized in Table 2(b).

TABLE 2(b)

Effect of Caustic on Modified Pea Starch

| | 1 | 2 | 3 | 4 | 5 | 6 |
|---|---|---|---|---|---|---|
| Water (ml) | 500 | 500 | 500 | 500 | 500 | 500 |
| Modified Pea Starch (g) | 88 | 88 | 88 | 88 | 88 | 88 |
| Heat to (°F.) | 140 | 140 | 140 | 140 | 140 | 140 |
| Caustic (g) | 10 | 12 | 16 | 20 | 24 | 28 |
| Mix at 600 RPM (min) | 15 | 15 | 15 | 15 | 15 | 15 |
| Viscosity at 103° F. (centipoise) | 670 | 584 | 662 | 660 | 684 | 704 |
| Viscosity 24 hours (centipoise) | 550 | 424 | 400 | 400 | 408 | 446 |

As can be seen from the above summary, the viscosity stability of the modified pea starch remained relatively stable notwithstanding the wide variations in the differing caustic treatments.

EXAMPLE 3

The following study was carried out to determine the effect of different heating (cooking) temperatures of the viscosity stability of a modified wheat "B" starch of the present invention. In accordance with that study 5 samples were prepared by admixing 520 milliliters of water with 60.5 grams of modified wheat "B" starch. The 5 samples were then heated to 120° F., 130° F., 140° F., 150° F. and 160° F., respectively. Ten grams of caustic soda was then added to the dispersion and the admixture was mixed at 600 rpm. The initial Brookfield viscosity was measured at 103° F. and the viscosity was also measured again after 24 hours. The results are summarized in Table 3 below:

TABLE 3

Effect of Temperature on Modified Wheat "B" Starch

| | 1 | 2 | 3 | 4 | 5 |
|---|---|---|---|---|---|
| Water | 520 | 520 | 520 | 520 | 520 |
| Modified Wheat "B" Starch | 60.5 | 60.5 | 60.5 | 60.5 | 60.5 |
| Heat to °F. | 120 | 130 | 140 | 150 | 160 |
| Caustic | 10 | 10 | 10 | 10 | 10 |
| Mix at 600 RPM (min) | 15 | 15 | 15 | 15 | 15 |
| Visc. at 103° F. (centipoise) | 420 | 435 | 400 | 390 | 410 |
| Visc. 24 hrs | 400 | 430 | 440 | 400 | 400 |

TABLE 3-continued

| Effect of Temperature on Modified Wheat "B" Starch | | | | | |
|---|---|---|---|---|---|
| | 1 | 2 | 3 | 4 | 5 |
| (centipoise) | | | | | |

As can be seen from the above-summarized data, the effect on the viscosity stability of modified wheat "B" starch of the present invention of different heating temperatures is nominal.

EXAMPLE 3(b)

The following study was carried out to determine the effect of different heating (cooking) temperatures of the viscosity stability of a modified, air-classified pea starch of the present invention. In accordance with that study 5 samples were prepared by admixing 500 milliliters of water with 88 grams of modified pea starch. The 5 samples were then heated to 120° F., 130° F., 140° F., 150° F. and 160° F., respectively. Ten grams of caustic soda was then added to the dispersion and the admixture was mixed at 600 rpm. The initial Brookfield viscosity was measured at 103° F. and the viscosity was also measured again after 24 hours. The results are summarized in Table 3(b) below:

TABLE 3(b)

| Effect of Temperature on Modified Pea Starch | | | | | |
|---|---|---|---|---|---|
| | 1 | 2 | 3 | 4 | 5 |
| Water | 500 | 500 | 500 | 500 | 500 |
| Modified Pea Starch | 88 | 88 | 88 | 88 | 88 |
| Heat to °F. | 120 | 130 | 140 | 150 | 160 |
| Caustic | 10 | 10 | 10 | 10 | 10 |
| Mix at 600 RPM (min) | 15 | 15 | 15 | 15 | 15 |
| Visc. at 103° F. (centipoise) | 710 | 666 | 670 | 786 | 830 |
| Visc. 24 hrs (centipoise) | 476 | 508 | 550 | 576 | 610 |

As can be seen from the above-summarized data, the effect on the viscosity stability of modified pea starch of the present invention of different heating temperatures is nominal.

EXAMPLE 4

The following study was carried out to determine the effect of shear time on modified wheat "B" starch of the present invention. Four samples of aqueous dispersions of modified wheat "B" starch were prepared by mixing 520 milliliters of water with 60.5 grams of modified wheat "B" starch, which samples were then heated to 130° F. and admixed with 10 grams of caustic soda. The four resulting mixtures were then subjected to 15, 30, 45 and 60 minutes, respectively, of agitation at 600 rpm. As with the two immediately preceding examples, the Brookfield viscosity of the mixtures was read at 103° F. both immediately and after 24 hours. The results are summarized below in Table 4.

TABLE 4

| Effect of Shear Time on Modified Wheat "B" Starch | | | | |
|---|---|---|---|---|
| | 1 | 2 | 3 | 4 |
| Water | 520 | 520 | 520 | 520 |
| Modified Wheat "B" Starch | 60.5 | 60.5 | 60.5 | 60.5 |
| Heat to °F. | 130 | 130 | 130 | 130 |
| Caustic | 10 | 10 | 10 | 10 |
| Mix at 600 | 15 | 30 | 45 | 60 |

TABLE 4-continued

| Effect of Shear Time on Modified Wheat "B" Starch | | | | |
|---|---|---|---|---|
| | 1 | 2 | 3 | 4 |
| RMP (min) | | | | |
| Visc. at 103° F. (centipoise) | 435 | 380 | 400 | 370 |
| Visc. 24 hr (centipoise) | 430 | 350 | 400 | 360 |

As shown above, the effects of differing shear times produce relatively nominal effects on the viscosity stability of modified wheat "B" starch of the present invention.

EXAMPLE 4(b)

The following study was carried out to determine the effect of shear time on modified, air-classified pea starch of the present invention. Four samples of aqueous dispersions of modified pea starch were prepared by mixing 500 milliliters of water with 88 grams of modified pea starch, which samples were then heated to 130° F. and admixed with 10 grams of caustic soda. The four resulting mixtures were then subjected to 15, 30, 45 and 60 minutes, respectively, of agitation at 600 rpm. As with the two immediately preceding examples, the Brookfield viscosity of the mixtures was read at 103° F. both immediately and after 24 hours. The results are summarized below in Table 4(b).

TABLE 4(b)

| Effect of Shear Time on Modified Pea Starch | | | | |
|---|---|---|---|---|
| | 1 | 2 | 3 | 4 |
| Water | 500 | 500 | 500 | 500 |
| Modified Pea Starch | 88 | 88 | 88 | 88 |
| Heat to °F. | 140 | 140 | 140 | 140 |
| Caustic | 10 | 10 | 10 | 10 |
| Mix at 600 RPM (min) | 15 | 30 | 45 | 60 |
| Visc. at 103° F. (centipoise) | 670 | 600 | 700 | 660 |
| Visc. 24 hr (centipoise) | 550 | 484 | 492 | 528 |

As shown above, the effects of differing shear times produce relatively nominal effects on the viscosity stability of modified pea starch of the present invention.

EXAMPLE 5

The following example illustrates the high lot to lot variability in the initial viscosities of Stein-Hall adhesives incorporating unmodified "B" starch carriers of the type disclosed in Canadian Pat. No. 1,106,106. Five Stein-Hall adhesives were prepared using 5 different lots of standard, commercially-available wheat "B" starch. One hundred and forty parts of each of the 5 lots of unmodified wheat "B" starch were mixed with 2000 parts of water. The resulting slurry was then thoroughly mixed and heated to 140° F. Thirty-two parts of flake caustic soda was dissolved in a suitable amount of water and then added to the heated mixture of unmodified wheat "B" starch in water. The resulting mixture was then agitated for at least 15 minutes. Finally 2400 parts of water, 1060 parts of corn starch and 20 parts of borax pentahydrate were added to the admixture and the whole resulting Stein-Hall adhesive was agitated until a smooth texture was obtained.

The preparation of each of these samples is summarized in Table 5A below.

TABLE 5A

| | | |
|---|---|---|
| Water | 2000 | parts |
| Unmodified Wheat B Starch | 140 | parts |
| Heat to | 140° | F. |
| Flake Caustic | 32 | parts |
| Mix no less than | 15 | min. |
| Water | 2400 | parts |
| Corn Starch | 1060 | parts |
| Borax Pentahydrate | 20 | parts |
| Mix until smooth | 15 | min. |

Once the 5 Stein-Hall adhesives (Samples A through E inclusive) had been prepared, their initial Stein-Hall viscosities, in seconds, were measured. These viscosities are summarized below in Table 5B.

TABLE 5B

| Sample | Stein-Hall Viscosity (sec) |
|---|---|
| A | 49 |
| B | 55 |
| C | 39 |
| D | 28 |
| E | 21 |

These widely varying initial viscosities make it undesirable to formulate adhesives using unmodified wheat "B" starches as carriers for reasons already mentioned hereinbefore.

EXAMPLE 6

The following example illustrates the properties of a Stein-Hall adhesive based on a modified wheat "A" starch carrier composition, which carrier composition was prepared in the same manner as the modified wheat "B" starch carriers of the present invention, but using a wheat "A" starch as the raw material.

Three hundred and fifty-two parts of the modified wheat "A" starch were mixed into 2000 parts of water. The resulting slurry was heated under agitation to 140° F. Thirty-six parts of flaked caustic soda were dissolved in a suitable amount of water and added to the hot mixture and the whole was agitated for at least 15 more minutes. Finally, 2200 parts of water, 1248 parts of corn starch and 21 parts of borax pentahydrate were added to the mixture. The resulting Stein-Hall adhesive was then agitated until a smooth texture was obtained. The preparation of such an adhesive is summarized in Table 6A below.

TABLE 6A

| | | |
|---|---|---|
| Water | 2000 | parts |
| Modified "A" Starch | 352 | parts |
| Heat to | 140° | F. |
| Caustic | 36 | parts |
| Mix no less than | 15 | min. |
| Water | 2200 | parts |
| Corn Starch | 1248 | parts |
| Borax Pentahydrate | 21 | parts |
| Mix until smooth | 15-30 | min. |

The viscosity of the resulting adhesives were found to be 51 seconds initially and 57 seconds after twenty-four hours at 102° F., when measured in a Stein-Hall Cup. One such lot of Stein-Hall corrugating adhesive based on a modified wheat "A" starch carrier was divided into 2 samples.

The first sample of adhesive was stored overnight without agitation in a closed container submerged in a water bath maintained at 102° F. The following day the viscosity of this batch of adhesive had set back to the point where even after agitation, the viscosity was still 170 seconds when measured in the Stein-Hall Cup.

The second sample of adhesive was permitted to cool down while under vigorous agitation. The following profile of viscosity versus temperature was obtained when the viscosity was checked with the Stein-Hall Cup.

TABLE 6B

| | |
|---|---|
| 55 sec. @ | 102° F. |
| 80 sec. @ | 95° F. |
| 105 sec. @ | 90° F. |
| 160 sec. @ | 85° F. |

The results from these tests show the undesirable viscosity increases which take place when Stein-Hall adhesives prepared with modified wheat "A" starch carriers were stored under conditions which are less than ideal or when equipment failures, such as agitator or heating system breakdowns, occur.

EXAMPLE 7

This example deals with the properties of a Stein-Hall adhesive prepared using a modified corn starch carrier composition. The modified corn starch carrier used in this example was prepared in the same manner as the dry acid, hydrolytically modified wheat "B" starch of the present invention.

Three hundred and fifty-two parts of the modified corn starch were mixed into 2000 parts of water. The resulting slurry was heated with agitation to 140° F. Thirty-six parts of flaked caustic soda were dissolved in a suitable amount of water and added to the hot mixture. The whole admixture was then agitated for at least 15 minutes. Finally, 2200 parts of water, 1248 parts of corn starch and 21 parts of borax pentahydrate were added and the resulting Stein-Hall adhesive was agitated until a smooth texture was obtained.

The preparation of the Stein-Hall adhesives based on the modified corn starch carrier is summarized below in Table 7A.

TABLE 7A

| | | |
|---|---|---|
| Water | 2000 | parts |
| Modified Corn Starch | 352 | parts |
| Heat to | 140° | F. |
| Caustic | 36 | parts |
| Mix no less than | 15 | min. |
| Water | 2200 | parts |
| Corn Starch | 1248 | parts |
| Borax Penathydrate | 21 | parts |
| Mix until smooth | 15-30 | min. |

Two samples were prepared and the viscosity of the resulting adhesives was found to be 52 seconds and 56 seconds, respectively, at 102° F. when measured in a Stein-Hall Cup.

The first sample of the corrugating adhesive was stored overnight without agitation in a closed container submerged in a water bath maintained at 102° F.

The following day, the viscosity of this first sample of adhesive had set back to the point where even after agitation, the viscosity was still 125 seconds when measured in a Stein-Hall Cup.

A second sample of adhesive was left to cool down while undergoing vigorous agitation. The following viscosity profile versus temperature was obtained when the viscosity was checked with the Stein-Hall Cup.

TABLE 7B

| | |
|---|---|
| 52 sec. @ | 102° F. |
| 72 sec. @ | 95° F. |
| 95 sec. @ | 90° F. |
| 130 sec. @ | 85° F. |

The results from these tests indicate that undesirable viscosity increases may take place when adhesives prepared with modified corn starch carriers are stored under conditions which are less than ideal or when equipment failures, such as agitator or heating system breakdowns, occur.

EXAMPLE 8

This example pertains to the characteristics of Stein-Hall adhesives prepared using a high amylose corn starch carrier composition.

Three hundred and fifty-two parts of a high amylose corn starch were admixed with 2000 parts water. The resulting slurry was then heated under agitation to 140° F. Thirty-six parts of flaked caustic soda was dissolved in a suitable amount of water and was added to the hot admixutre. The whole was then agitated for at least 15 minutes. Finally, 2200 parts of water, 1248 parts of corn starch and 21 parts of borax pentahydrate were added and the entire admixture was agitated until a smooth texture was obtained. The preparation of such Stein-Hall adhesives is summarized below in Table 8A.

TABLE 8A

| | | |
|---|---|---|
| Water | 2000 | parts |
| High Amylose Corn Starch | 352 | parts |
| Heat to | 140° | F. |
| Caustic | 36 | parts |
| Mix no less than | 15 | min. |
| Water | 2200 | parts |
| Corn Starch | 1248 | parts |
| Borax Pentahydrate | 21 | parts |
| Mix until smooth | 15-30 | min. |

Two samples were prepared and the viscosity of the resulting adhesives was found to be 40 seconds and 42 seconds, respectively, at 102° F. when measured in a Stein-Hall Cup.

One sample of the adhesive was stored overnight without agitation in a closed container submerged in a water bath maintained at 102° F.

The following day the viscosity of this batch of adhesive had set back slightly to the point where after agitation the viscosity was 52 seconds when measured in a Stein-Hall Cup.

A second sample of adhesive was allowed to cool down while vigorous agitation was maintained. The following profile of viscosity versus temperature was obtained when the viscosity was checked in each instance with the Stein-Hall Cup.

TABLE 8B

| | |
|---|---|
| 42 sec. @ | 102° F. |
| 54 sec. @ | 95° F. |
| 58 sec. @ | 90° F. |
| 64 sec. @ | 85° F. |

The results from these tests indicate that undesirable, although probably tolerable, viscosity increases may take place when adhesives prepared with high amylose corn starch carriers are stored under conditions which are less than ideal or when equipment failures, such as agitator or heating system breakdowns, occur.

EXAMPLE 9

This example pertains to certain characteristics of Stein-Hall adhesives prepared based on the modified "B" starch carrier composition of the present invention.

Three hundred and fifty-two parts of modified wheat "B" starch were mixed into 2200 parts of water. The resulting slurry was heated under agitation to 140° F. Forty parts of flaked caustic soda were dissolved in a suitable amount of water and were added to the hot mixture. The whole was then agitated for at least 15 minutes. Finally, 2320 parts of water, 1248 parts of corn starch and 12 parts of borax pentahydrate were added. The admixture was then agitated until a smooth texture was obtained. This formulation is summarized below in Table 9A.

TABLE 9A

| | | |
|---|---|---|
| Water | 2200 | parts |
| Modified "B" Starch | 352 | parts |
| Heat to | 140° | F. |
| Caustic | 40 | parts |
| Mix no less than | 15 | min. |
| Water | 2320 | parts |
| Corn Starch | 1248 | parts |
| Borax Pentahydrate | 12 | parts |
| Mix until smooth | 15-30 | min. |

Two samples were prepared and the viscosity of the resulting Stein-Hall adhesives as measured at 102° F. in a Stein-Hall Cup were 44 seconds and 39 seconds, respectively.

One sample of this Stein-Hall adhesive was stored overnight without agitation in a closed container which was submerged in a waterbath maintained at 102° F.

The following day the viscosity of this sample of adhesive had not set back. After agitation the viscosity was 39 seconds when measured in the Stein-Hall Cup.

A second sample of the adhesive was permitted to cool down under vigorous agitation. The following profile of viscosity versus temperature was obtained when viscosity was checked with the Stein-Hall Cup.

TABLE 9B

| | |
|---|---|
| 39 sec. @ | 102° F. |
| 38 sec. @ | 95° F. |
| 38 sec. @ | 90° F. |
| 39 sec. @ | 85° F. |

The results from these tests indicate that there is no significant change in viscosity when Stein-Hall adhesives prepared from modified wheat "B" starch carriers of the present invention are stored under conditions which are less than ideal or when equipment failures such as agitator failures or heating system breakdowns occur.

A comparative summary of the data presented in the preceding Examples 6 through 10 is presented below in Table 11.

EXAMPLE 10

This example pertains to certain characteristics of Stein-Hall adhesives prepared based on the modified pea starch carrier composition of the present invention.

Three hundred and fifty-two parts of modified pea starch were mixed into 2200 parts of water. The resulting slurry was heated under agitation to 140° F. Forty parts of flaked caustic soda were dissolved in a suitable amount of water and were added to the hot mixture. The whole was then agitated for at least 15 minutes.

Finally, 2200 parts of water, 1360 parts of corn starch and 12 parts of borax pentahydrate were added. The admixture was then agitated until a smooth texture was obtained. This formulation is summarized below in Table 10(a).

TABLE 10(a)

| | |
|---|---|
| Water | 2000 parts |
| Modified "B" Starch | 352 parts |
| Heat to | 140° F. |
| Caustic | 40 parts |
| Mix no less than | 15 min. |
| Water | 2200 parts |
| Corn Starch | 1360 parts |
| Borax Pentahydrate | 12 parts |
| Mix until smooth | 15-30 min. |

The viscosity of the resulting Stein-Hall adhesives as measured at 102° F. in a Stein-Hall Cup was 37 seconds and 39 seconds.

One sample of this Stein-Hall adhesive was stored overnight without agitation in a closed container which was submerged in a waterbath maintained at 102° F.

The following day the viscosity of this sample of adhesive had not set back. After agitation the viscosity was 40 seconds when measured in the Stein-Hall Cup.

A second sample of the adhesive was permitted to cool down under vigorous agitation. The following profile of viscosity versus temperature was obtained when viscosity was checked with the Stein-Hall Cup.

TABLE 10(b)

| | |
|---|---|
| 37 sec. @ | 102° F. |
| 38 sec. @ | 95° F. |
| 39 sec. @ | 90° F. |
| 39 sec. @ | 85° F. |

The results from these tests indicate that there is no significant change in viscosity when Stein-Hall adhesives prepared from modified wheat "B" starch carriers of the present invention are stored under conditions which are less than ideal or when equipment failures such as agitator failures or heating system breakdowns occur.

TABLE 11

Summary Table of Data Presented in Preceding Examples 6-10

| | Example | | | | |
|---|---|---|---|---|---|
| | 10 | 9 | 8 | 7 | 6 |
| | Carrier | | | | |
| | Modified Pea Starch | Modified Wheat B Starch | High Amylose Corn Starch | Modified Corn Starch | Modified Wheat A Starch |
| Weight (parts) | 352 | 352 | 352 | 352 | 352 |
| 1st Sample | | | | | |
| Initial visc. @ 102° F. (sec) | 37 | 44 | 40 | 52 | 51 |
| Visc. after 24 @ 102° F. (sec) | 40 | 39 | 52 | 125 | 170 |
| 2nd Sample | | | | | |
| Visc. (sec) @ 102° F. | 37 | 39 | 42 | 56 | 57 |
| @ 95° F. | 38 | 38 | 54 | 72 | 80 |
| @ 90° F. | 39 | 38 | 58 | 95 | 105 |
| @ 85° F. | 39 | 39 | 64 | 130 | 160 |

As is clearly apparent from the results summarized in Table 11, not even the high-performance, high-priced, high amylose corn starch was as stable as the acid-treated, hydrolytically modified wheat "B" starch of the present invention.

The ultimate test of any Stein-Hall adhesive, however, is to be judged mainly on its performance in bonding the various boards together to produce a corrugated board product. The most rigorous test of any Stein-Hall adhesive's performance is the water-resistance test.

Accordingly, therefore, three Stein-Hall adhesives were prepared and tested under identical conditions using a MacMillan Bloedel Research Limited Wet Shear Tester Model No. TMI44-6, available from Testing Machines Inc., 400 Bayview Avenue, Amityville, N.Y. U.S.A.

The first such Stein-Hall adhesive comprised a raw corn starch portion and a carrier composition based on the modified wheat "B" starch of the present invention. The second Stein-Hall adhesive also used a raw corn starch portion but the carrier was made up of a modified wheat "A" starch. The third Stein-Hall adhesive was made up of a raw wheat portion together with a carrier based on a modified wheat "A" starch. Table 12, below, summarizes the water resistance performance of these three corrugating adhesives on wax impregnated board.

TABLE 12

Water Resistance of Corrugating Adhesive
Wax Impregnated Board
Medium and Single Face Liner are Wax Impregnated on Corrugating
Water Resistance Tested with MBR Wet Shear Tester Using 2 kg Load

| Stein-Hall Wheat Carrier Starch | Adhesive Raw Starch | Board Weights SF Liner Medium DB Liner (pounds/1000 square feet) | | | Water Resistance Time to Bond Failure in secs. |
|---|---|---|---|---|---|
| Modified "B" | Corn | 42 | 33 | 42 | 5400 |
| Modified "A" | Corn | 42 | 33 | 42 | 2549 |
| Modified "A" | Wheat | 42 | 33 | 42 | 2881 |

The data presented in Table 12 clearly shows that the Stein-Hall adhesive based on the modified wheat "B" starch of the present invention significantly out-performs the other two Stein-Hall corrugating adhesives.

Table 13, below, summarizes a comparison between a Stein-Hall adhesive based on a raw wheat starch portion and a modified wheat "B" starch of the present invention with a second Stein-Hall adhesive based on a raw corn starch portion with a carrier composition based on high amylose corn starches. None of the boards used in this test were wax impregnated and hence, the corrugated boards were much more susceptible to the effects of water than were the boards tested in relation to Table 12 above.

TABLE 13

Water Resistance of Corrugated Board
Unwaxed Board
Water Resistance Tested with MBR Wet Shear Tester
Using 1 kg Load

| Stein-Hall Carrier Starch | Adhesive Raw Starch | Board Weights SF Liner (pounds/1000 square feet) | Medium | DB Liner | Water Resistance Time to Bond Failure in secs |
|---|---|---|---|---|---|
| Modified "B" Wheat | Wheat | 69 | 33 | 69 | 571 |
| High Amylose Corn | Corn | 42 | 33 | 42 | 133 |

The data summarized in Table 13 clearly demonstrates the superior performance of Stein-Hall adhesives based on the modified wheat "B" starch of the present invention relative to Stein-Hall adhesives based on the more costly Stein-Hall adhesives based on high amylose corn starch carriers.

We claim:

1. A modified wheat "B" starch wherein aqueous dispersions of said modified wheat "B" starch have reduced viscosities relative to comparable aqueous dispersions of a corresponding unmodified wheat "B" starch, said reduced viscosities not being less than about 12 centipoise grams per cubic centimeter for a precooked 15/1 water to modified starch dispersion at between 33° C. to 36° C.

2. The modified wheat "B" starch of claim 1 wherein said modified wheat "B" starch has been modified by way of a partial hydrolysis of starch granules contained therein.

3. The modified wheat "B" starch of claim 2 wherein said partial hydrolysis is carried out at an acid pH at ambient or higher temperatures of about 20° C. or more.

4. The modified wheat "B" starch of claim 3 wherein said modified wheat "B" starch is an acid treated, modified wheat "B" starch.

5. The modified wheat "B" starch of claim 4 wherein said acid treated, modified wheat "B" starch is a dry acid treated modified wheat "B" starch.

6. The modified wheat "B" starch of claim 5 wherein said acid pH is adjusted to within the range of about 2.5 to 3.5, and said partial hydrolysis is carried out at a temperature of about 200° F. to 340° F.

7. The modified wheat "B" starch of claim 6 wherein said acid pH is about 3.1.

8. The modified wheat "B" starch of claim 7 wherein said temperature is about 230° F.

9. The modified wheat "B" starch of claim 5 wherein said acid pH is between about 2.8 and 5.4, and said temperature is about 200° F. to 340° F.

10. The modified wheat "B" starch of claim 4 wherein an aqueous slurry containing wheat "B" starch is modified by treating said slurry with an acid to adjust the pH thereof to between about 1.0 to 2.5, permitting hydrolysis to proceed at 20° C. to 40° C. to produce said modified wheat "B" starch having a reduced viscosity and thereafter neutralizing said pH of said slurry to about a pH of 3.0 to 7.0.

11. The modified wheat "B" starch of claim 2 wherein said partial hydrolysis is an enzymatic hydrolysis.

12. The modified wheat "B" starch of claim 1 wherein said modified wheat "B" starch is an oxidized wheat "B" starch.

13. The modified wheat "B" starch of claim 1 wherein said modified wheat "B" starch is a cross-linked wheat "B" starch.

14. The modified wheat "B" starch of claim 1 wherein said reduced viscosity is between about 12 and 80 centipoise grams per cubic centimeter.

15. The modified wheat "B" starch of claim 13 wherein said reduced viscosity is between about 13 to 27 centipoise grams per cubic centimeter.

16. The modified wheat "B" starch of claim 14 wherein said reduced viscosity is between about 18 to 25 centipoise grams per cubic centimeter.

17. A modified starch selected from one of the group consisting of wheat, barley, rye or legume starches wherein said modified starch contains an increased amount of non-starch, non-protein hydrophilic colloids indigenous to said starch and relative to a corresponding regular starch and wherein aqueous dispersions of said modified starch have reduced viscosities relative to comparable aqueous dispersions of said corresponding regular starch, said reduced viscosity not being less than about 12 centipoise grams per cubic centimeter for a precooked 15/1 water to modified starch dispersion at between 33° C. to 36° C.

18. The modified starch of claim 17 wherein the selected starch is pea starch.

19. The modified starch of claim 17 wherein the selected starch is wheat starch.

20. A carrier composition for use in a Stein-Hall corrugating adhesive, said carrier consisting essentially of a modified starch selected from one of the group consisting of wheat, barley, rye or legume starches wherein said modified starch contains an increased amount of non-starch, non-protein hydrophilic colloids indigenous to said starch and relative to a corresponding regular starch and wherein aqueous dispersions of said modified starch have reduced viscosities relative to comparable aqueous dispersions of said corresponding regular starch, said reduced viscosity not being less than about 12 centipoise grams per cubic centimeter for a precooked 15/1 water to modified starch dispersion at between 33° C. to 36° C.

21. The carrier composition of claim 20 wherein the selected modified starch is a wheat starch.

22. The carrier composition of claim 21 wherein said wheat starch is a wheat "B" starch.

23. The carrier composition of claim 22 wherein said wheat "B" starch has been modified by way of a partial hydrolysis of starch granules contained therein.

24. The carrier composition of claim 23 wherein said partial hydrolysis is carried out at an acid pH at ambient or higher temperatures of about 20° C. or more.

25. The carrier composition of claim 24 wherein said modified wheat "B" starch is an acid treated, modified wheat "B" starch.

26. The carrier composition of claim 25 wherein said acid treated, modified wheat "B" starch is a dry acid treated modified wheat "B" starch.

27. The carrier composition of claim 26 wherein said acid pH is adjusted to within the range of about 2.5 to 3.5 and said partial hydrolysis is carried out at temperatures of about 200° F. to 340° F.

28. The carrier composition of claim 27 wherein said acid pH is adjusted to about 3.1.

29. The carrier composition of claim 28 wherein the temperature is about 230° F.

30. The carrier composition of claim 20 wherein said reduced viscosity is between about 12 and 80 centipoise grams per cubic centimeter.

31. The carrier composition of claim 22 wherein said reduced viscosity is between about 12 and 80 centipose grams per cubic centimeter.

32. The carrier composition of claim 20 wherein said reduced viscosity is between about 13 to 27 centipoise grams per cubic centimeter.

33. The carrier composition of claim 22 wherein said reduced viscosity is between about 13 to 27 centipoise grams per cubic centimeter.

34. The carrier composition of claim 20 wherein said reduced viscosity is between about 18 to 25 centipoise grams per cubic centimeter.

35. The carrier composition of claim 22 wherein said reduced viscosity is between about 18 to 25 centipoise grams per cubic centimeter.

36. A high-solids Stein-Hall corrugating adhesive composition wherein the improvement comprises a carrier composition consisting essentially of a modified starch selected from the group consisting of wheat, barley, rye or legume starches, wherein said modified starch contains an increased amount of non-starch, non-protein, hydrophillic colloids indigenous to said starch and relative to a corresponding regular starch and wherein aqueous dispersions of said modified starch have reduced viscosities relative to comparable aqueous dispersions of said corresponding regular starch, said reduced viscosity being in the range of about 12 to 27 centipoise grams per cubic centimeter for a precooked 15/1 water to modified starch dispersion between 33° C. to 36° C.

37. The corrugating adhesive composition of claim 36 wherein said reduced viscosity is in the range of about 18 to 25 centipoise grams per cubic centimeter.

38. The corrugating adhesive composition of claim 36 wherein the selected modified starch is a wheat starch.

39. The corrugating adhesive composition of claim 36 wherein the selected modified starch is a wheat "B" starch.

40. The corrugating adhesive compositon of claim 39 wherein said wheat "B" starch is a hydrolytically modified wheat "B" starch.

41. The corrugating adhesive composition of claim 39 wherein said wheat "B" starch is a dry acid treated, hydrolytically modified wheat "B" starch.

42. A corrugated paper board product wherein at least one liner and one medium ply thereof are joined together with an adhesive composition consisting essentially of a modified starch selected from the group consisting of wheat, barley, rye or legume starches wherein said modified starch contains an increased amount of non-starch, non-protein, hydrophilic colloid indigenous to said starch and relative to a corresponding regular starch and wherein aqueous dispersions of said modified starch have reduced viscosities relative to comparable aqueous dispersions of said corresponding regular starch, said reduced viscosity not being less than about 12 centipoise grams per cubic centimeter for a precooked 15/1 water to modified starch dispersion at between 33° C. and 36° C.

43. A process for producing a modified starch wherein said process comprises the steps of fractionating a regular starch selected from one of the group consisting of wheat, barley, rye or legume starches into a prime starch fraction and a second starch fraction containing an increased concentration of non-starch, non-protein hydrophilic colloid indigenous to said regular starch and relative to said regular starch and modifying said second starch fraction to produce a modified starch wherein aqueous dispersions of said modified starch have reduced viscosities relative to comparable aqueous dispersions of a corresponding regular starch, said reduced viscosity not being less than about 12 centipoise grams per cubic centimeter for a precooked 15/1 water to modified starch dispersion at between 33° C. to 36° C.

44. The process of claim 43 wherein said regular starch is a wheat starch.

45. The process of claim 43 wherein said second starch fraction is a wheat "B" starch.

46. The process of claim 45 wherein said wheat "B" starch is modified by heating said wheat "B" starch at about 200° F. to 340° F.

47. The process of claim 46 wherein the pH of said wheat "B" starch is adjusted using a gaseous acid to a pH of about 2.5 to 3.5.

48. The process of claim 47 wherein said pH is adjusted to about 3.1.

49. The process of claim 46 wherein said wheat "B" starch is modified by heating said wheat "B" starch at about 230° F.

50. A process for producing a Stein-Hall carrier composition comprising the steps of mixing the carrier starch with water to produce a slurry, heating the slurry to a preparation temperature and adding caustic soda thereto, agitating the resulting mixture to shear down its false body wherein the improvement comprises utilizing as a carrier starch a modified second grade starch selected from one of the group consisting of wheat, barley, rye or legume starches which modified second grade starch contains an increased concentration, relative to a corresponding regular starch of the same time, of non-starch, non-protein, hydrophilic colloids indigenous to the selected starch type;
wherein aqueous dispersions of said modified starch have reduced viscosities relative to comparable aqueous dispersions of said corresponding regular starch, said reduced viscosity not being less than about 12 centipoise grams per cubic centimeter for a precooked 15:1 water to modified starch dispersion at between 33° C. to 36° C.; and
wherein said preparation temperature is substantially less than about 130° F. but not less than about 80° F.

51. A process according to claim 50 wherein said modified second grade starch is a modified wheat "B" starch.

52. A process according to claim 50 wherein said modified second grade starch is a modified pea starch.

53. A process according to claim 50 comprising the further steps of adding additional water; raw starch and borax to said carrier composition to produce a Stein-Hall adhesive composition.

54. A process according to claim 53 wherein said modified second grade starch is a modified wheat "B" starch.

55. A process according to claim 53 wherein said modified second grade starch is a modified pea starch.

* * * * *